US008850985B2

(12) United States Patent
Maljkovic et al.

(10) Patent No.: US 8,850,985 B2
(45) Date of Patent: Oct. 7, 2014

(54) POLYMERIC MATERIAL SUITABLE FOR MAKING AMMUNITION CARTRIDGE CASINGS

(71) Applicant: Solvay Advanced Polymers, L.L.C., Alpharetta, GA (US)

(72) Inventors: Nikica Maljkovic, New Orleans, LA (US); Todd S. Rushing, Clinton, MS (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 0 days.

(21) Appl. No.: 13/628,200

(22) Filed: Sep. 27, 2012

(65) Prior Publication Data

US 2014/0235784 A1 Aug. 21, 2014

Related U.S. Application Data

(60) Continuation of application No. 12/853,128, filed on Aug. 9, 2010, now abandoned, which is a division of application No. 11/074,616, filed on Mar. 7, 2005, now Pat. No. 8,240,252.

(51) Int. Cl.
*F42B 5/307* (2006.01)
*F42B 5/297* (2006.01)

(52) U.S. Cl.
CPC .................. *F42B 5/307* (2013.01); *F42B 5/297* (2013.01)
USPC .......................................... 102/466; 528/397

(58) Field of Classification Search
CPC ............ F42B 5/295; F42B 5/297; F42B 5/30; F42B 5/307; F42B 5/313
USPC ................................... 102/466; 528/206, 397
See application file for complete search history.

(56) References Cited

U.S. PATENT DOCUMENTS

| | | | |
|---|---|---|---|
| 3,060,856 A | 10/1962 | Dunn |
| 3,745,924 A | 7/1973 | Scanlon |
| 3,989,792 A | 11/1976 | San Miguel |
| 3,990,366 A | 11/1976 | Scanlon |
| 4,065,437 A | 12/1977 | Blinne et al. |
| 4,108,837 A | 8/1978 | Johnson et al. |
| 4,147,107 A | 4/1979 | Ringdal |

(Continued)

FOREIGN PATENT DOCUMENTS

| | | |
|---|---|---|
| DE | 40 15 542 | 11/1991 |
| EP | 0222827 | 5/1991 |

(Continued)

OTHER PUBLICATIONS

Parodi Fabrizio, "Polysulfones", Comprehensive Polymer Science (1989), vol. 5, Chapter 33, p. 561-591, Pergamon Press.

(Continued)

*Primary Examiner* — Stephen M Johnson
(74) *Attorney, Agent, or Firm* — Oblon, Spivak, McClelland, Maier & Neustadt, L.L.P.

(57) ABSTRACT

An ammunition article is provided which comprises a casing and a cap wherein the casing is formed from a polymeric material that has a room temperature notched Izod impact value greater than about 10 ft lbs/in and then has a ratio of notched Izod impact value at room temperature to notch Izod impact value at about −40° C. of less than about 4.

9 Claims, 5 Drawing Sheets

(56) References Cited

U.S. PATENT DOCUMENTS

| | | | |
|---|---|---|---|
| 4,175,175 | A | 11/1979 | Johnson et al. |
| 4,228,218 | A | 10/1980 | Takayanagi et al. |
| 4,326,462 | A | 4/1982 | Garcia et al. |
| 4,574,703 | A | 3/1986 | Halverson |
| 4,614,157 | A | 9/1986 | Grelle et al. |
| 4,726,296 | A | 2/1988 | Leshner et al. |
| 4,839,435 | A | 6/1989 | Gergen et al. |
| 5,033,386 | A | 7/1991 | Vatsvog |
| 5,151,555 | A | 9/1992 | Vatsvog |
| 5,227,457 | A | 7/1993 | Marrocco, III et al. |
| 5,259,288 | A | 11/1993 | Vatsvog |
| 5,434,224 | A | 7/1995 | McGrail et al. |
| 5,539,048 | A | 7/1996 | Gagne et al. |
| 5,565,543 | A | 10/1996 | Marrocco, III et al. |
| 5,646,231 | A | 7/1997 | Marrocco, III et al. |
| 5,654,392 | A | 8/1997 | Marrocco, III et al. |
| 5,659,005 | A | 8/1997 | Marrocco, III et al. |
| 5,668,245 | A | 9/1997 | Marrocco, III et al. |
| 5,670,564 | A | 9/1997 | Gagne et al. |
| 5,721,335 | A | 2/1998 | Marrocco, III et al. |
| 5,756,581 | A | 5/1998 | Marrocco, III et al. |
| 5,760,131 | A | 6/1998 | Marrocco, III et al. |
| 5,824,744 | A | 10/1998 | Gagne et al. |
| 5,827,527 | A | 10/1998 | Leonard |
| 5,827,927 | A | 10/1998 | Gagne et al. |
| 5,869,592 | A | 2/1999 | Gagne et al. |
| 5,886,130 | A * | 3/1999 | Trimmer et al. ............... 528/171 |
| 6,087,467 | A | 7/2000 | Marrocco, III et al. |
| 6,228,970 | B1 | 5/2001 | Savariar |
| 6,586,554 | B1 | 7/2003 | Takahashi |
| 6,752,084 | B1 | 6/2004 | Husseini et al. |
| 7,404,884 | B2 * | 7/2008 | Montminy et al. ........... 204/632 |
| 7,628,152 | B2 | 12/2009 | Patterson et al. |
| 7,750,091 | B2 | 7/2010 | Maljkovic et al. |
| 2001/0013299 | A1 | 8/2001 | Husseini et al. |
| 2003/0181603 | A1 | 9/2003 | Venderbosch et al. |
| 2003/0225221 | A1 * | 12/2003 | Beek et al. .................... 525/397 |
| 2006/0069236 | A1 | 3/2006 | Brunelle et al. |
| 2006/0207464 | A1 | 9/2006 | Maljkovic et al. |
| 2007/0066738 | A1 | 3/2007 | Gallucci et al. |

FOREIGN PATENT DOCUMENTS

| | | |
|---|---|---|
| EP | 0 436 111 | 7/1991 |
| GB | 672706 | 5/1952 |
| GB | 732633 | 6/1955 |
| GB | 1568545 | 5/1980 |
| WO | WO 83/00213 | 1/1983 |
| WO | WO 86/06466 | 11/1986 |
| WO | WO 89/07496 | 8/1989 |
| WO | WO 92/07024 | 4/1992 |
| WO | WO 95/13516 | 5/1995 |

OTHER PUBLICATIONS

Encyclopedia of Polymer Science and Technology: "Plastics, Resins, Rubbers, Fibers", vol. 11, 1969.

Encyclopedia of Polymer Science and Technology: "Polysulfones," XP 002047103, vol. 13, 1985.

Standard ASTM D256, Historical 2005 Revision A, "Test Methods for Determining the IZOD Pendulum Impact Resistance of Plastics", p. 1-20.

Standard ASTM D638, Historical 2003, "Test Method for Tensile Properties of Plastics", p. 1-15.

Naitove M.H., "Self-reinforcing thermoplastic is harder, stronger, stiffer without added fibers", Plastics Technology, Jul. 2003, 2 pp., Gardner Publications Inc.

Standard ASTM D790, Historical 2003, "Test Methods for Flexural Properties of Unreinforced and Reinforced Plastics and Electrical Insulating Materials", p. 1-11.

Confidential Sales Information.

Baldwin D., et al., "A microcellular processing study of poly(ethylene terephthalate) in the amorphous and semicrystalline states. Pat I : microcell nucleation", Polymer Engineering and Science (1996), vol. 36 (11), p. 1437-1445, Society of Plastics Engineers.

Gedde Ulf W., "Polymer-polymer blends", Polymer Physics (1999), Chapter 4.7, p. 70-73, Kluwer Academic Publishers, Dordrecht, Netherland.

Marrocco M. et al., "Poly-XTM self reinforced polymers : processible molecular composites", 39th International SAMPE Symposium and Exhibition, Apr. 11-14, 1994, p. 1063-1072, Society for the Advancement of Material and Process Engineering.

"A Guide to Polycarbonate in General," *Engineering Polymer Specialists Polymer Technology & Services, LLC*, pp. 1-5.

"Development Product Makrolon® DPI-1848, Polycarbonate Copolymer Resin General Purpose Grade," *Bayer Polymers*, May 2203, pp. 1-4.

"GE Plastics, Lexan® EXL9330 Americas: Commerical," *General Electric Company*, Last updated Sep. 29, 2004, pp. 1-5.

"Low Temperature Notched Izod Impact of RADEL R-5xxx Resins", File No. 2803, Solvay Advanced Polymers, LLC., Jan. 7, 1999, 1 page.

"Preliminary Product Data, RTP 1899A X 83675 Polycarbonate/Acrylic Alloy (PC/PMMA) Thin Wall Grade," RTP Company Product Data Sheet, 5 pages, available at http://www.rtpcompany.com/info/data/1800A/RTP1899AX83675.htm Printed Mar. 7, 2005.

* cited by examiner

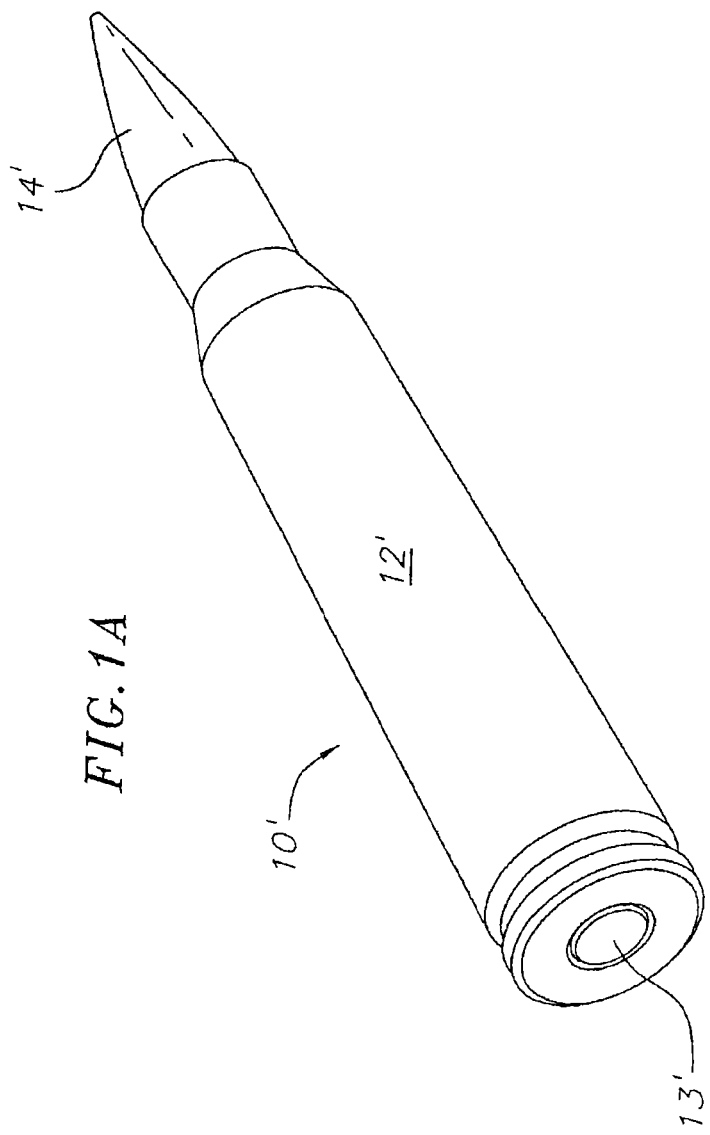

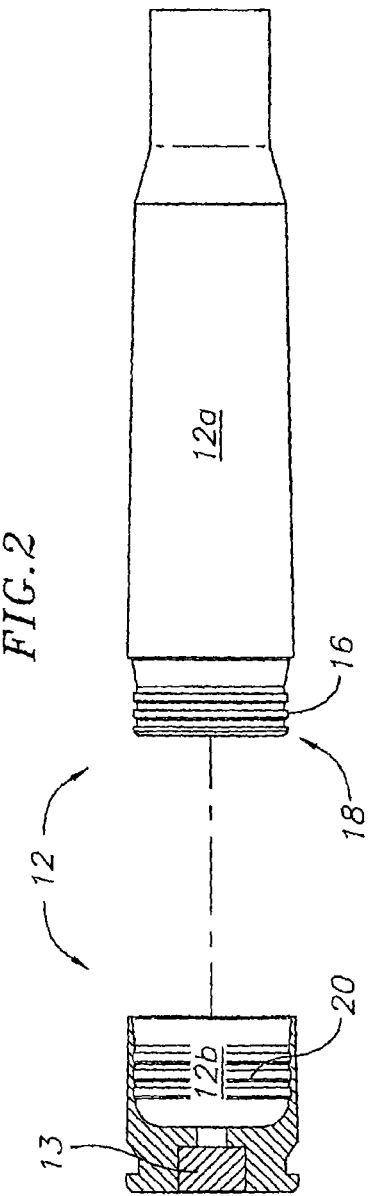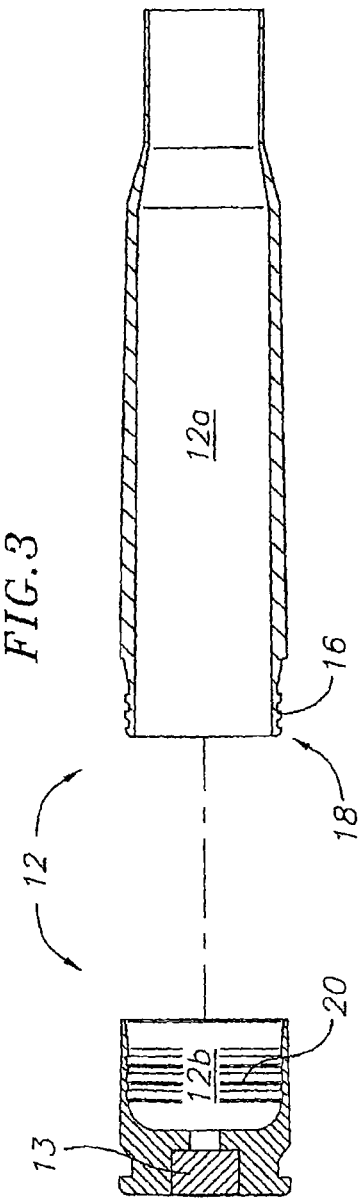

US 8,850,985 B2

POLYMERIC MATERIAL SUITABLE FOR MAKING AMMUNITION CARTRIDGE CASINGS

CROSS REFERENCE TO RELATED APPLICATIONS

This application is a continuation application of prior U.S. application Ser. No. 12/853,128, filed Aug. 9, 2010, now abandoned, the disclosure of which is incorporated herein by reference in its entirety. The parent application is a divisional application of prior U.S. application Ser. No. 11/074,616, filed Mar. 7, 2005, now U.S. Pat. No. 8,240,252, the disclosure of which is incorporated herein by reference in its entirety.

FIELD OF INVENTION

The present invention relates to ammunition articles, and, more particularly, to ammunition cartridge casings, where at least a portion of the casing is comprised of a polymeric material.

BACKGROUND OF INVENTION

Because of the extreme nature of the application, materials used for fabrication of ammunition cartridges must demonstrate excellent mechanical and thermal properties. The prevalent materials for production of cartridge casings for all calibers of ammunition in the world today are metals. Brass is the leading material, followed in smaller amounts by steel and, in limited amounts, aluminum. The use of polymeric materials for ammunition cartridge casings has been extensively investigated over the past 40 years, but success has been elusive.

Brass, steel, and, to a lesser degree, aluminum cartridge casings suffer from a number of disadvantages, the most important of which are heavy weight and corrosion concerns. Aluminum has an added disadvantage of potential explosive oxidative degradation and is thus used only in low-pressure cartridges or in applications that can tolerate relatively thick casing walls. Given these issues, desirable materials for ammunition cartridge casing fabrication would be lightweight and impervious to corrosion while having mechanical properties suitable for use in ammunition applications. Many lightweight polymeric materials are sufficiently corrosion resistant; however, to date, polymers have been used only in niche ammunition applications where their inferior mechanical and thermal properties can be tolerated (e.g., shotgun shells contain polyethylene components).

While stability under broad ranges of handling and storage conditions are crucial, the greatest mechanical demands on the cartridge material are experienced during the firing event. The material at the cartridge base end, which supports the primer, must first absorb the impact of a firing pin on the primer without mechanical failure. Upon ignition and combustion of an encapsulated propellant, rapidly expanding gases create high pressure, which expels a projectile from the barrel of the fired firearm. The ammunition cartridge casing must withstand and contain the pressure developed by the explosion so that the gaseous combustion products expand only in the direction of the barrel opening, thus maximizing energy conversion to projectile kinetic energy.

A firearm's cartridge chamber closely fits the outside of a cartridge and thus supports the majority of the cartridge casing wall in the radial direction; however, in many firearms, a portion of the cartridge base end protrudes from the chamber and is thus unsupported. During firing, a stress profile is developed along the cartridge casing, with the greatest stresses being concentrated at the base end. Therefore, the cartridge base end must posses the greatest mechanical strength, while a gradual decrease in material strength is acceptable axially along the casing toward the forward end which receives the projectile.

A typical brass cartridge casing is engineered to provide a strength profile along the casing length which reflects the varying mechanical demands, with the strongest and hardest material located at the cartridge base end. In brass and other metals, a strength profile is easily induced by varying the heat treatment conditions from one end of the casing to the other, but this is not an option for polymers. A mechanical strength profile can be achieved in a polymeric ammunition cartridge casing by varying the casing wall thickness; however, where the casing external geometry is fixed by existing firearm chamber size, an increased casing wall thickness often results in a casing with insufficient internal volume to accept the required propellant charge.

Many ammunition articles have been designed with cartridge cases comprised of two or more separate parts. The individual components are typically fabricated from different materials; a high-strength, usually metallic material comprises the cartridge casing base portion or "cap" while a polymer or other material comprises the remainder of the casing. For example, commercial shotgun ammunition employs a metallic base or cap joined to a polymeric top or sleeve. Although a significant amount of metal is required for such an ammunition cartridge, weight and cost savings can be sufficient to make it commercially acceptable.

While the most severe mechanical requirements of an ammunition cartridge are focused on the base end, the top or forward portion of the casing must meet several material requirements as well. Upon combustion of the cartridge propellant, a very large quantity of energy is released in a matter of a few milliseconds, thus producing very high stresses and strain rates. The casing material must possess adequate ductility to absorb the shock of the explosion without experiencing brittle fracture. Also, the material must possess sufficient rigidity and strength to avoid creep, flow, or other deformation.

A vast amount of effort has been dedicated to designing plastic ammunition cartridges, and researchers in the field have tested a variety of materials. Despite these attempts, consistent success has not been achieved.

Because of the demands on the casing material, the key problem in developing polymer-cased ammunition remains identifying a suitable polymeric material. It appears that all of the polymeric materials tried thus far are critically deficient in either their absorption of the impact energies generated during the firing event or their retention of mechanical integrity at high temperatures. A significant improvement in the art would be the identification of polymeric materials capable of at least serving as the top or forward portion of the ammunition cartridge casing.

SUMMARY OF THE INVENTION

In accordance with the present invention an ammunition article comprising a cartridge casing is provided wherein the casing is comprised of a polymeric material that has a room temperature notched Izod impact strength or value greater than about 10 ft-lb/in (as measured by ASTM D256-00) and that has a ratio of notched Izod strength value at room temperature to notched Izod impact value at about −40° C. of less than about 4.

In a second embodiment of the present invention an ammunition article comprising a cartridge casing is provided wherein the casing is comprised of two or more pieces or portions and at least one portion of the casing is comprised of a polymeric material that has a room temperature notched Izod impact strength greater than about 10 ft-lb/in (as measured by ASTM D256-00) and that has a ratio of notched Izod impact strength at room temperature to notched Izod impact strength at about −40° C. of less than about 4.

BRIEF DESCRIPTION OF THE DRAWINGS

FIG. 1A is a semi-schematic perspective view of an ammunition article provided in accordance with practice of the present invention comprising a one-piece cartridge casing, a primer and a projectile (the powder or propellant charge is not shown);

FIG. 2 is a semi-schematic, perspective exploded view of the cartridge casing and primer of FIG. 1 showing both the caselet and cap portions of the casing with the cap portion in cross-section;

FIG. 3 is a semi-schematic, cross-sectional view of the cartridge casing and primer of FIG. 1 showing both the caselet and cap portions of the casing in cross-section.

DETAILED DESCRIPTION OF THE INVENTION

For the purposes of the present invention, the term "ammunition article" as used herein refers to a complete, assembled round of ammunition that is ready to be loaded into a firearm and fired. An ammunition article may be a live round fitted with a projectile, or a blank round with no projectile. An ammunition article may be any caliber of pistol or rifle ammunition and may also be other types such as non-lethal rounds, rounds containing rubber bullets or other non-metallic projectiles, rounds containing multiple projectiles (shot), and rounds containing projectiles other than bullets such as fluid-filled canisters and capsules. An ammunition article may be of a known type or of a type or design developed subsequent to this disclosure.

Figure 1:
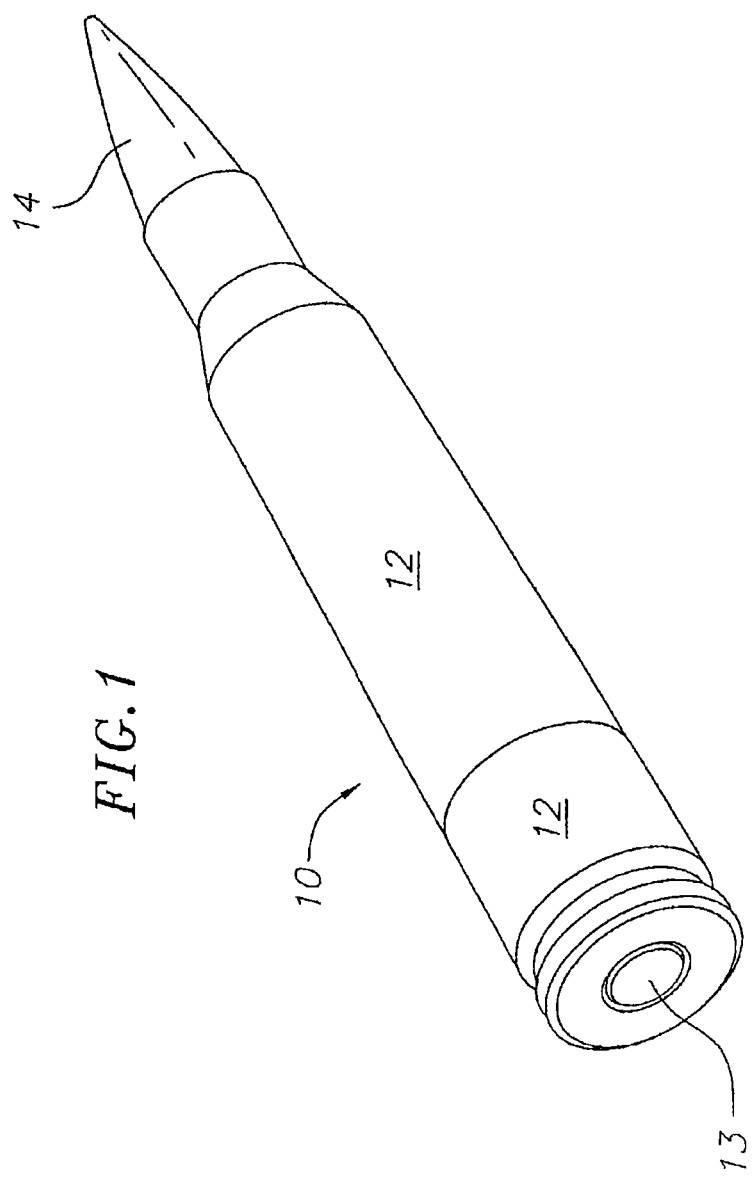
FIG. 1 is a semi-schematic perspective view of an ammunition article provided in accordance with practice of the present invention comprising a two-piece cartridge casing, a primer and a projectile (the powder or propellant charge is not shown)

Turning to FIG. 1, there is shown a semi-schematic perspective view of an exemplary embodiment of an ammunition article 10 provided in accordance with practice of the present invention. The ammunition article 10 comprises a cartridge casing (or simply "casing") 12 which is the component that holds the propellant charge (not shown), the primer 13, and the projectile 14. Thus, the cartridge casing 12 is the portion of an ammunition article that remains intact after firing. A cartridge casing may be of one-piece or multi-piece construction.

Turning to FIGS. 2 and 3 in addition to FIG. 1, in one embodiment of the present invention, the casing 12 is of two piece construction wherein the casing includes a "caselet" portion 12a which comprises the forward piece or portion of the casing and a "cap" portion 12b which comprises the closed end of the cartridge casing where the primer 13 is positioned. In the illustrated embodiment, the caselet portion 12a and the cap portion 12b are held together by means of ribs 16 on the outside surface of an extension 18 on the caselet 12a and ribs 20 on the inside surface of the cap 12b which snap fit together when the cap is press fit onto the caselet.

Turning to FIG. 1A, an ammunition article 10' is shown which comprises a one piece casing 12', a primer 13' and a projectile 14'.

The term "high modulus" polymer or polymeric material as used herein means a polymer or copolymer having a room temperature flexural modulus of at least 500,000 psi, more preferably at least 750,000 psi, and even more preferably at least 900,000 psi measured in accordance with ASTM D790. Other measures of modulus may also be used including but not limited to tensile modulus, and shear modulus.

The term "room temperature" is well-familiar to the skilled in the art ; it denotes usually a temperature of about 23° C.

When referring to a property (for example, impact strength) of a polymeric material for purposes of the present invention, what is meant is that property of the raw material as it exists just prior to molding, forming, or otherwise fashioning into a usable part (for example, an ammunition casing component). Of course, some processing of the material may be necessary for property measurement (for example, a test specimen of appropriate geometry must be molded for impact testing), and we do not intend to imply departure from standard methodologies. By indicating that a part such as a cartridge casing is comprised of a polymeric material having certain properties, we do not mean those properties of the material as they exist in the "as-molded" part, but properties of the material from which the part was formed. The raw material may be a pure polymer or copolymer resin, and may also contain any combination of additives, modifiers, blend components, and the like.

A necessary property of a polymeric material used in ammunition cartridge casings provided in accordance with practice of the present invention is the material's ability to absorb large amounts of energy at high strain rates. An indication of such energy absorbing characteristics is a material's impact strength, or its response to flexural shock. Some of the best currently available commercial polymeric materials used for energy absorption include amorphous resins such as Bisphenol-A polycarbonates (e.g., bullet-proof glass) and semi-crystalline resins such as elastomer-modified polyamides (e.g., sporting equipment). (Bisphenol-A polycarbonate is provided by GE plastics under the trademark LEXAN® 141R; one such elastomer-modified polyamide is provided by DuPont under the trademark Zytel FE 8194 NC 010.)

Traditional measures of impact strengths of molding resins are impact tests such as Izod and Charpy tests. The data most widely available is the data for a notched Izod impact test, conducted under ASTM D256-00 standard at room temperature (about 23° C. or 73° F.). The whole content of ASTM D256-00 is herein incorporated by reference.

When notched Izod impact strength values are referred to herein, they are measured in accordance with the ASTM D256-00 standard, Method A, unless otherwise noted. Throughout the description and claims of the instant application, by "ASTM D256" is specifically meant ASTM D256-00, Method A. In accordance with the ASTM D256 standard, we have indicated the sample test temperature in conjunction with each Izod impact strength value given herein. (ASTM D256-00, "Determining the Izod Pendulum Impact Resistance of Plastics," ASTM International).

We recognize that measured Izod impact strengths for a given polymeric material will exhibit some degree of variability from sample to sample and from test to test. A skilled artisan will appreciate that Izod impact strength values stated herein are not exact, but represent average values around which actual experimental values will deviate within acceptable limits.

The following testing parameters are identified by ASTM as those which may affect test results significantly: method of test specimen fabrication including but not limited to processing technology, mold design, molding conditions, and thermal treatments; method of notching, speed of notching tool, design of notching apparatus, and quality of the notch; time between notching and test; test specimen thickness and test specimen width under notch; and environmental conditioning (ASTM D256-00). Therefore, when comparing Izod impact strengths of a given material at different temperatures, it is preferable that specimen temperature be the only variable between impact strength measurements.

The following table provides impact strength data for two materials traditionally used for energy absorbing applications:

TABLE I

Room temperature notched Izod impact strengths of selected thermoplastics. (ASTM D256)

| Polymer | Acronym | Impact Strength |
|---|---|---|
| Bisphenol-A polycarbonate GE Plastics Datasheet Lexan 141R (© 1997-2003) | PC | 15 ft-lb/in (Izod Impact, notched, 73° F.) |
| Hi-impact polyamide 612 DuPont Plastics Datasheet Zytel ® FE 8194 NC010 (Online Material Data Sheet dated Dec. 9, 2004) | PA612 | 17.5 ft-lb/in (Izod Impact, notched, 73° F.) |

Figure 4:
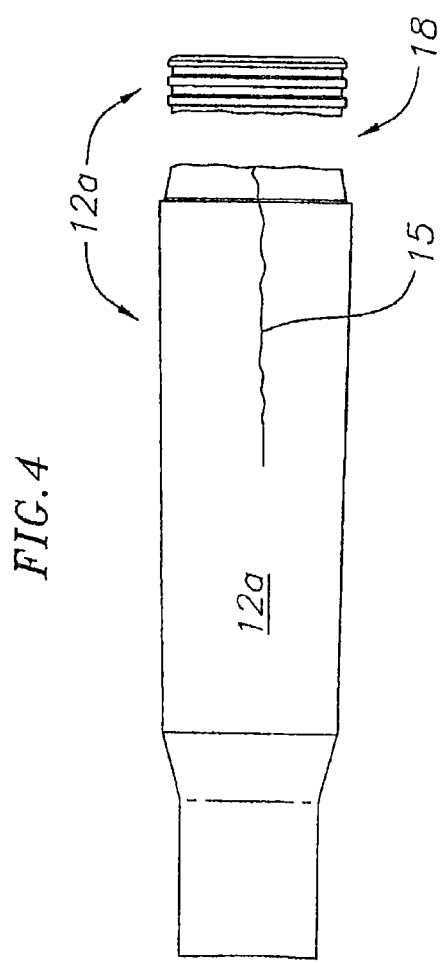
FIG. 4 is a semi-schematic perspective side view of a cartridge caselet formed from a Bisphenol-A polycarbonate that has failed upon firing.

Even the materials identified in Table 1, which represent the state-of-the-art in impact absorption, often fail in an ammunition casing application. For example, the failure of a Bisphenol-A polycarbonate polymeric caselet 12a portion of a cartridge casing 12 at room temperature is illustrated in FIG. 4, wherein the caselet 12a has a crack 15 along its axis and a portion of the extension 18 has completely failed and separated from the casing ribs.

Introduction of an elastomeric phase has been a traditional pathway to increasing the energy absorbing capacity of a thermoplastic material. Thus, rubber-filled nylons have been proposed for the plastic portions of two-piece (cap and caselet) ammunition casings, but have met with limited success. Again, it appears that during firing events the interface between polymer and metal is the critical region for failure, and reports have indicated problems with polyamide 612 type materials at this interface. In addition, the relatively low glass transition temperatures of polyamide 612 materials (about 50° C.) causes these materials to soften in the hot chamber of a firearm during rapid firing.

Furthermore, the polyamide 612 type materials exhibit a propensity for dimensional and mechanical property instability owing to the hydrophilic nature of the polymer structure.

It is important to note that the polymer materials discussed above do not fail every time during the firing event and that they perform adequately in many instances. For example, in test firing performed on casings formed from Lexan® PC, three out of four such PC cases performed adequately with one case failing as above. Given the extreme nature of the application, however, a useful polymeric material must perform perfectly a great majority of the time. Preferably, polymeric cartridge casings will survive more than 99% of live ammunition firings; more preferably, more than 99.9%; even more preferably, more than 99.99%; still more preferably, more than 99.999%. Even higher success rates are more preferable, the most preferable scenario being 100% casing survival.

It is therefore important in accordance with practice of the present invention to; 1) provide material guidelines that allow one skilled in the art to correctly identify polymeric materials likely to meet the high-strain-rate energy absorbing demands of ammunition cartridge casings, and 2) to teach means of fabricating such cartridge casings from the polymeric materials.

Identified below are examples of materials that withstand the demands of the ammunition application and are used to form ammunition articles in accordance with practice of the present invention. These example materials include but are not limited to siloxane-modified Bisphenol-A polycarbonates (S-PC, for example, provided under the Trademark Lexan® EXL 9330 by General Electric Company—GE Plastics, GE Plastics Datasheet, Lexan® EXL 9330 (5 pages) (© 1997-2003)); polycarbonates containing biphenyl linkages (B-PC, for example, provided under the Trademark Makrolon® DP1-1848 by Bayer Polymers LLC of Pittsburgh Pa., Bayer Polymers Datasheet, Makrolon® DP1-1848 (4 pages) (dated May 2003)), and polyphenylsulfones (PPSU, for example, provided under the Trademark Radel® R-5700 NT, by Solvay Advanced Polymers, LLC of Alpharetta, Ga., Low Temperature Notched Izod Impact of Radel® R-5xxx Resins, Radel®R 5700NT-5 pages)). The whole content of above referenced GE, Bayer and Solvay Advanced Polymers data sheets are incorporated herein by this reference. The polymer material energy-absorbing capabilities, as measured by the notched Izod testing (ASTM D256, room temperature of 23° C., same as above) are given in Table II.

TABLE II

Room temperature notched Izod impact strengths of selected thermoplastics. (ASTM D256)

| Polymer | Acronym | Impact Strength |
|---|---|---|
| Siloxane-modified Bisphenol-A polycarbonate | S-PC | 15 ft-lb/in |
| Bisphenol-A polycarbonate with biphenyl linkages | B-PC | 13 ft-lb/in |
| Polyphenylsulfone | PPSU | 12.5 ft-lb/in |

A standard measure of a polymer's ability to absorb the energy generated during a high-strain-rate event is the room temperature notched Izod test, ASTM D256. Notched Izod impact strength values, reported in Tables I and II, indicate that PC and PA612 are clearly superior to S-PC, B-PC and PPSU. It was thus an unexpected result that S-PC, B-PC, and PPSU cartridge casing components survived many live ammunition firings without any signs of visible damage and that the polymer cased ammunition performed equivalently to the conventional brass ammunition. This is in direct contrast to the earlier attempts utilizing PC and PA612 materials, where cartridge casing failures were often observed.

Wishing not to be bound by theory, we believe that the reason for the superior performance of the materials disclosed above results from their superior energy absorbing behavior. The unobvious key to the efficient selection of the proper materials is to examine their impact absorbing characteristics not only at ambient temperatures, but also at temperatures far below ambient temperatures. For example, the comparison of notched Izod values at room temperature revealed that the PC and PA612 materials have higher impact strengths than the successfully fired materials, S-PC, B-PC, and PPSU. However, the situation is different when impact strength data is compared at sub-ambient temperatures.

Table III below lists notched Izod impact strengths for the five materials mentioned above measured at temperatures far below room temperature. Low temperature notched Izod impact strength values are less readily available than room temperature data. As a result, the data reported in Table III were not obtained at exactly the same low temperature for all materials.

In comparing the room temperature Izod data of Tables I and II to the low temperature data of Table III, a distinct difference is observed between the properties of the group of polymeric casing materials that sometimes failed live ammunition firing versus the group of casing materials that survived firing. The last column of Table III lists values for the ratios of notched Izod impact data taken at room temperature to notched Izod data taken at low temperature; thus, the ratio value is indicative of the degree of impact strength loss upon cooling. The inadequate materials lose an excessive amount of their impact strengths when cooled to low temperature (high ratio values). The data provided in Table III was derived from the following data sheets the whole content of which is incorporated herein by reference: (1) Solvay Advanced Polymers, Low Temperature Notched Izod Impact of Radel® R-5xxx Resins, Radel® R 5700 NT and (2) "A Guide to Polycarbonate in General", provided by Engineering Polymer Specialists. Acceptable materials for ammunition cartridge casings are those that retain a substantial quantity of their impact strengths upon cooling. Surprisingly, a polymeric material that is suitable for ammunition cartridge casings is one whose ratio of notched Izod impact strength measured at room temperature to notched Izod impact strength measured at –40° C. (or lower) has a value less than 4.

Note that the low temperature data point for the B-PC material is reported at –30° C. This reflects the data reported in the referenced Makrolon® data sheet for the ASTM D256 impact test. Notched Izod impact data are reported for this material as measured by an alternate test method, ISO 180-4, as follows: 60 kJ/m$^2$ at 23° C., 55 kJ/m$^2$ at –30° C., and 50 kJ/m$^2$ at –60° C. Though a direct correlation between the ISO and ASTM test methods does not exist, the ratio of notched Izod values measured by a given method will be comparable from method to method. The ISO data for the B-PC material reveal that the material does not experience a significant reduction in ductility when cooled from 23° C. to –60° C. In fact the ratio of reported impact strengths at these temperatures has a value of 1.2, far less than 4. This is a qualitative indication that the material's impact strength ratio at room temperature and –40° C. measured by the ASTM method will be significantly less than 4. Therefore, the B-PC material is categorized with the PPSU material as outperforming the PC and PA612 materials in the Table III comparison.

Though the data provided for S-PC were not collected at –40° C., we consider the comparison valid since the data for this material are reported at a more severe (colder) condition than the PC and PA612 materials, and the former still outperforms the latter by a wide margin.

TABLE III

Low temperature notched Izod impact strengths of selected thermoplastics. (ASTM D256)

| Polymer | Acronym | Temp | Impact Strength | Ratio |
|---|---|---|---|---|
| Bisphenol-A Polycarbonate | PC | –40° C. | 1.8 ft-lb/in | 8.3 |
| Hi-impact polyamide 612 | PA612 | –40° C. | 2.5 ft-lb/in | 7.0 |
| Siloxane-modified Bisphenol-A polycarbonate | S-PC | –51° C. | 11 ft-lb/in | 1.4 |
| Bisphenol-A polycarbonate with biphenyl linkages | B-PC | –30° C. | 11 ft-lb/in | 1.2 |
| Polyphenylsulfone | PPSU | –40° C. | 3.9 ft-lb/in | 3.2 |

In order to determine suitable materials for manufacturing of polymeric cartridge casings or casing portions in accordance with the present invention, it is important to consider both the impact resistance at room temperature as well as the impact resistance at temperatures far below the usual use temperatures.

Preferably, the polymeric materials useful for cartridge casings provided according to practice of the present invention will have room temperature notched Izod values greater than about 10 ft lbs/in (as measured by ASTM D256) and have the ratio of notched Izod values at room temperature to notched Izod values at about –40° C. of less than about 4.

More preferably, the polymeric materials useful for cartridge casings provided according to practice of the present invention have room temperature notched Izod values greater than about 10 ft lbs/in (as measured by ASTM D256) and have the ratio of notched Izod values at room temperature to notched Izod values at about –40° C. of less than about 3.5.

Still more preferably, the polymeric materials useful for cartridge casings provided according to the present invention have room temperature notched Izod values greater than about 12 ft lbs/in (as measured by ASTM D256) and have the ratio of notched Izod values at room temperature to notched Izod values at about –40° C. of less than about 4.

Most preferably, the polymeric materials useful for cartridge casings provided according to practice of the present invention will have room temperature notched Izod values greater than about 12 ft lbs/in (as measured by ASTM D256) and have the ratio of notched Izod values at room temperature to notched Izod values at about –40° C. of less than about 3.5. The ratio of notched Izod values at room temperature to notched Izod values at –40° C. may be less than about 3 or less than about 2.5 or even less. Lower ratio values indicate superior low temperature impact performance and are thus preferable in practice of the present invention.

Other polymeric materials useful for cartridge casings provided according to the present invention have room temperature notched Izod values greater than about 10 ft lbs/in (as measured by ASTM D256) and have the ratio of notched Izod values at room temperature to notched Izod values at about –40° C. of less than about 3. The ratio of notched Izod values at room temperature to notched Izod values at about –40° C. may be less than about 2.5 or even less. Again, even lower ratio values are more preferred.

We do not, in any way, intend to limit the low temperature impact strength requirement to Izod values measured at about –40° C. Obviously, a material which retains a high impact strength at even lower temperatures would be suitable for use in ammunition cartridge casings. Therefore, for purposes of determining the ratio of Izod impact strengths at room temperature and low temperature according to the invention, the low temperature impact strength may be measured at a temperature near –45° C., or near –50° C., or near –55° C., or near −60° C., or at even lower temperatures. Therefore a ratio of notched Izod at room temperature to notched Izod at −45° C. (or lower) of 4 or less will generally mean that the ratio taken between room temperature and −40° C. is also 4 or less; therefore, any such material is also useful in the practice of the present invention. Also, a skilled artisan will recognize that, though not as preferable, the impact strength ratio could be determined from values measured at room temperature and at temperatures slightly greater than −40° C.

In one embodiment of the present invention, an ammunition cartridge casing is comprised of a polymeric material having a room temperature notched Izod value greater than about 10 ft lbs/in (as measured by ASTM D256) wherein the ratio of notched Izod values at room temperature to notched Izod values at about −50° C. is less than about 4. In a more preferred embodiment, an ammunition cartridge casing is comprised of a polymeric material having a room temperature notched Izod values greater than about 10 ft lbs/in (as measured by ASTM D256) wherein the ratio of notched Izod value at room temperature to notched Izod values at about −50° C. is less than about 3.5. In an even more preferred embodiment, an ammunition cartridge casing is comprised of a polymeric material having a room temperature notched Izod value greater than about 12 ft lbs/in (as measured by ASTM D256) wherein the ratio of notched Izod values at room temperature to notched Izod values at about −50° C. of less than about 4. In a still more preferred embodiment, an ammunition cartridge casing is comprised of a polymeric material having room temperature notched Izod value greater than about 12 ft lbs/in (as measured by ASTM D256) wherein the ratio of notched Izod values at room temperature to notched Izod values at about −50° C. of less than about 3.5.

Because of the broad availability of corresponding data, the notched Izod impact test is used herein as a standard of comparison in describing the present invention. It is noted, however, that other test methods such as the Izod (unnotched) and Charpy tests provide measures of impact strength and are thus indirectly applicable in the practice of the present invention. Though actual impact strength values and, consequently, strength ratios do not correlate directly, a polymeric material having a small (less than about 4 or 5) ratio of impact strengths at room temperature and low temperature (−40° C. or lower) as measured by any impact test method is potentially useful for ammunition cartridge casings provided in accordance with practice of the present invention. A material that demonstrates good low temperature impact strength retention when subjected to other impact test methods should also exhibit similar performance in a notched Izod test. Therefore, room temperature versus low temperature impact strength measured using any standard impact testing procedure can be used to qualitatively evaluate a material for cartridge casing performance, but notched Izod data should be collected according to ASTM D256 if not already available to determine whether a material meets the criteria for casing components according to the present invention.

Ductility alone is not the only factor guiding the suitability of a given polymeric material for use as an ammunition casing material. We do not intend to suggest that every material meeting the impact criteria of this invention is useful for every ammunition application. The material impact requirements established by the present invention must be viewed in the context of additional factors such as creep resistance, thermal properties such as melting and glass transition points, chemical resistance, non-combustibility, dimensional stability, particular application requirements, coefficient of friction between the chamber and the case, and the like. The absence of sufficient ductility, or excessive loss of ductility upon cooling, however, does disqualify a given material from being useful as the case material as the material does not have sufficient energy absorbing capabilities to handle the demands placed on it by the firing event.

It is also important to note that useful polymeric materials are seldom single-component materials but are most often blends and mixtures of a number of components. For example, one of the materials useful in accordance with practice of the present invention (S-PC) and which is tested in a number of the Examples is a blend of two major components, a simple Bisphenol-A polycarbonate and a siloxane-polycarbonate copolymer. Thus, the materials useful in accordance with practice of this invention also include those provided by mixing together the polymers described above with other components designed to improve certain characteristics, with a caveat of not compromising the ductility requirements described above.

Materials for the present invention are not limited to pure polymeric resins that meet the impact strength requirements described herein. A person skilled in the art will recognize that various additives and fillers are often introduced into polymeric materials and can also be used in ammunition casing materials. Additives may include, but are not limited to, any combinations of plasticizers, lubricants, molding agents, fillers, thermo-oxidative stabilizers, flame-retardants, coloring agents, compatibilizers, impact modifiers, release agents, reinforcing fibers and others. Also, additives can be included in blends of more than one polymer or copolymer.

A non-limiting example of a useful cartridge casing material provided in accordance with the present invention could be produced by blending a high modulus polymeric material with a resin material that meets the impact requirements of this invention. The high modulus polymer would improve the creep and viscoelastic relaxation resistance of the base material, improving its mechanical integrity at high temperatures. While the polymers could be blended in any proportions, the amount of high modulus material is to be balanced so that the ductility of the resulting blend is sufficient to serve as an ammunition casing material. Non-limiting examples of amounts of high modulus material are about 50% by weight, more preferably about 25%, even more preferably about 15%, yet more preferably about 10%, even more preferably about 5%. Amounts less than 2.5%, less than 1%, or even less than 0.1% may have sufficient effect on mechanical properties as to be useful for the practice of the present invention. No lower limit of the percent of high modulus material is implied.

In one preferred embodiment the high modulus material may be the rigid rod polyphenylene polymer described in U.S. Pat. No. 5,886,130, the disclosure of which is incorporated herein by reference in its entirety. According to the embodiment the rigid-rod polyphenylene polymer is a copolymer of formula (1):

(1)

wherein —Ar— is at least 0.1 mol % of the recurring units in (1) and wherein —Ar— consists of the arylene repeat units (2) and (3):

(2)

and

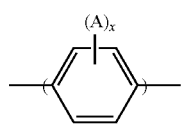

(3)

the number average segment length of the arylene segments is greater than 4, the number average segment length of para-arylene repeat units (3) is between 1 and about 8; the number average segment length of meta-arylene repeat units (2) is greater than 1;

x is 0-4, and the pendent groups (A) are chosen independently from the group consisting of —F, —CN, —CHO, —COR, —CR=NR', —OR, —SR, —SO$_2$R, —OCOR, —CO$_2$R, —NRR', —N=CRR', —NRCOR', —CONRR', and R, where R and R' are selected independently from the group consisting of H, alkyl, substituted alkyl, aryl, substituted aryl, heteroaryl and substituted heteroaryl, and R and R' if present together may form a bridging group;

Y is nil or one or more divalent groups chosen from —Z—, —Z-Ph-, and -Ph-Z-Ph-, where Z is a divalent group chosen from the group consisting of —O—, —S—, —NR—, —O(CO)—, —O(CO$_2$)—, —(CO)NH(CO)—, —NR(CO)—, phthalimide, pyromellitimide, —CO—, —SO—, —SO$_2$—, —P(O)R—, —CH$_2$—, —CF$_2$—, and —CRR'— and where Ph is phenylene (ortho, meta or para);

where at least 1 of every 100 repeat units has a pendent side group A; and wherein n is greater than about 4.

In an exemplary embodiment of an ammunition article of the present invention, an ammunition cartridge caselet is injection molded from a blend of siloxane-modified Bisphenol-A polycarbonate and a high modulus polymer or copolymer.

In yet another embodiment, an ammunition cartridge caselet is injection molded from a blend of Bisphenol-A polycarbonate with biphenyl linkages and a high modulus polymer or copolymer.

Blending either of these high impact polycarbonate based materials with a high modulus material is an example of a method for achieving improved viscoelastic relaxation properties.

One method of improving the low temperature impact strength of a plastic is blending the plastic with a flexible polymer or copolymer. Therefore, an example of a useful blend would be a Bisphenol-A polycarbonate alloyed with acrylic elastomer such as a material provided by RTP Company of Winona, Minn. and identified as RTP 1899A X 83675. Notched Izod impact properties of RTP 1899A X 83675 are reported as follows: 26 ft lbs/in at 23° C., and 17 ft lbs/in at −40° C. (values obtained from RTP Company, Mar. 4, 2005). Data sheets from RTP Company are incorporated herein by reference. The high temperature mechanical integrity of the RTP 1899A X 83675 material could be further improved by the addition of a high modulus polymer or copolymer. Blended materials of this type which meet the notched Izod ratio requirements described herein are useful in the practice of the present invention.

Other methods known in the art can be used to improve the low temperature impact properties of thermoplastic materials. The impact strength ratio requirements of the present invention may be met by modifying a number of known polymeric materials. Methods for increasing low temperature impact strengths of thermoplastic polymers include, but are not limited to:

Copolymerizing the base monomer with a second monomer to impart flexible linkages for energy absorption. Siloxane components, for example, are included as blocks in the polycarbonate backbone to improve low temperature impact strength in S-PC materials. Similarly, monomers incorporating biphenylene linkages are introduced into simple polycarbonate backbones and result in superior low temperature energy absorption materials (B-PC materials).

Blending or otherwise mixing an impact modifier to the base polymer resin such as the elastomeric blend component in the RTP 1899A X 83675 materials.

Formulating the polymeric composition to contain non-polymeric low temperature impact modifiers, an example being the addition of adipate plasticizers to PVC to improve the low temperature performance.

In the practice of the present invention, one could apply any combination of these and other techniques to create a material having a notched Izod ratio at room temperature to low temperature that meets the requirements of the present invention, and, thus, is a suitable material for ammunition cartridge casings to be provided in accordance with the present invention. Again, the designated impact properties alone are not sufficient to guarantee success in ammunition casings; additional polymer material requirements, such as those described above, are known to those of skill in the art as needed for the success of a polymeric material comprising an ammunition component.

According to the present invention, the designated polymeric materials may comprise any portion of an ammunition cartridge casing. Because of the more stringent mechanical demands on the bottom or base end of the cartridge casing as compared to the top end which secures the projectile, a two-piece or multi-piece cartridge casing may be preferred in which one piece is a high strength material that forms the base of the casing, e.g., the base may comprise a metal or a polymeric or composite material.

Hybrid polymer-metal cartridge casings are well known in the art and are preferred in the practice of the present invention. In a preferred embodiment, a polymeric caselet constitutes the forward portion of a cartridge casing, and a metallic cap forms the closed, rearward casing portion. The proportion of plastic to metal can vary, a larger percentage of plastic being preferred to maximize weight reduction, to enhance corrosion resistance, and to provide other advantages inherent in plastics. The amount of metal present is determined by the smallest metal cap size necessary to prevent cartridge failure during firing. Non-limiting amounts of polymeric material in a cartridge casing by weight are about 10%, more preferably about 20%, even more preferably about 30%, still more preferably about 40%, yet more preferably about 50%, even more preferably about 60%, more preferably about 70% and up.

The geometries of some ammunition articles are such that a relatively thick cartridge casing wall can be tolerated, still allowing room for the required propellant charge. Casings for such articles may be of a one-piece polymeric construction, provided that the material thickness can be designed to withstand the mechanical demands of the ammunition application. One-piece polymeric cartridge casings provided according to the present invention are comprised of a polymeric material which meets the mechanical property guidelines of the invention.

Material selection is only one aspect of successfully designing polymeric cased ammunition articles. Where polymeric cartridge casings or casing components are desired, materials of the invention must be used along with proper design of the polymeric part geometry. Obviously, a thicker casing wall improves the likelihood of casing survival during a firing event. Based on prior art, a skilled artisan is capable of designing, fabricating, and testing casing geometries and configurations in a logical manner to optimize the polymeric part design. Likewise, ammunition must be evaluated based on ballistic performance. Ordinary skill in the art will allow an individual to vary pertinent factors such as propellant type and load to optimize ballistic performance for a given application. Material property requirements as disclosed herein, however, are not known in the current state of the art and must be applied in conjunction with prior art knowledge of munitions.

One circumstantial limitation to casing wall thickness and, consequently, to material selection is that casing external geometries are fixed by the corresponding chamber internal geometry in existing firearms. In other words, new polymeric cased ammunition cartridges must be properly sized to fit into existing firearm chambers. Additionally, the minimum diameter of the casing forward end is set by the existing projectile diameter for a given caliber firearm. The significance is that though the part material and geometry together determine performance, limits on the flexibility of part design necessitate skilled material selection as disclosed herein.

Figure 5:
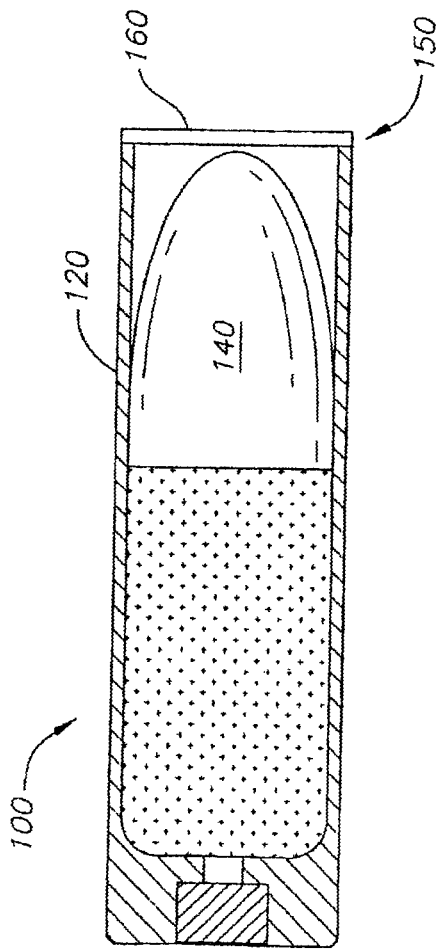
FIG. 5 is a semi-schematic, cross-sectional view of a non-traditional case telescoped ammunition article.

Casing geometrical limitations may be avoided by designing new firearm systems such that the chambers can accept cartridges having selected external dimensions, thus allowing, for example, thicker casing walls. An example of a developmental firearm system which could be designed to accommodate polymeric cased ammunition is one which fires case telescoped ammunition. An exemplary embodiment of a non-traditional ammunition article 100 is the experimental case telescoped ammunition, shown semi-schematically in FIG. 5, which incorporates a projectile 140 within the body of the cartridge casing 120. During the firing event, the projectile exits the cartridge casing 120 through either an opening in the forward end 150 of the cartridge or by penetrating a thin barrier 160 designed for penetration. The barrier 160 can be formed of the same material as forms the casing and can be any of the materials provided in accordance with the present invention as identified above. The firing chamber of such a firearm could, in principle, be constructed to fully support the cartridge casing along its entire length, thereby increasing the potential success of a one-piece polymeric casing design.

In one embodiment of the invention, an ammunition article is provided having a multi-piece cartridge casing. The casing is comprised of a metallic cap portion joined to a polymeric caselet portion, with the caselet comprising a material meeting the impact strength requirements defined above. The cap houses a live primer and is joined securely to the caselet. A propellant charge is introduced into the interior cavity formed by the assembled casing. A projectile is inserted into the open caselet end and secured with adhesive. The assembled ammunition article is loaded into a firearm chamber and fired.

Other non-limiting exemplary embodiments of methods for securing the projectile into the open end of a caselet are as follows:
1. forming the caselet by molding the polymeric material of the caselet around at least a portion of the projectile;
2. securing the projectile to the caselet by mechanical interference;
3. securing the projectile to the caselet by ultrasonic welding.
4. securing the projectile to the caselet by a combination of molding in place and use of an adhesive; and
5. securing the projectile to the caselet by heat crimping the caselet around the projectile.

Although no prior known polymeric material has proven suitable, several metals are useful for fabrication of the cap portion of a two-piece ammunition cartridge casing. A variety of metals have been utilized, including brass and various steel and aluminum alloys and they all work satisfactorily. According to one embodiment of the present invention, the cap portion of the cartridge casings may be made of any material that is mechanically capable of withstanding a firing event. Non-limiting cap materials include any grade of brass, steel and steel alloys, aluminum and its alloys, ceramics, composites, and others.

In a preferred embodiment of the present invention, a polymeric caselet is injection molded from a material having a room temperature notched Izod impact strength greater than about 10 ft lbs/in (as measured by ASTM D256) and having the ratio of notched Izod values at room temperature to notched Izod values at about −40° C. of less than about 4. A casing cap is fabricated from aluminum, steel, or brass, and designed to receive a primer. Aluminum is the preferred cap material because of its low cost and lightweight as compared to brass or steel. The caselet and cap are securely joined to form the cartridge casing. The casing is loaded with a propellant charge, and a projectile is inserted into the open end and secured. The assembled ammunition article is then loaded into a firearm and fired.

Many prior art methods are known for attaching the cap and caselet portions of an ammunition cartridge casing. Any method of attaching the caselet and cap is acceptable provided that the two components are joined securely and that gaseous combustion products are not allowed to escape through the assembled casing upon firing. Possible securing methods include, but are not limited to, mechanical interlocking methods such as ribs and threads, adhesives, molding in place, heat crimping, ultrasonic welding, friction welding etc. These and other suitable methods for securing individual pieces of a two-piece or multi-piece cartridge casing are useful in the practice of the present invention.

Many different types of ammunition articles are provided by the present invention. For example, polymeric materials that meet the impact strength requirements of the invention may be used to produce ammunition components for various calibers of firearms. Non limiting examples include 0.22, 0.22-250, 0.223, 0.243, 0.25-06, 0.270, 0.300, 0.30-30, 0.30-40, 30.06, 0.303, 0.308, 0.357, 0.38, 0.40, 0.44, 0.45, 0.45-70, 0.50 BMG, 5.45 mm, 5.56 mm, 6.5 mm, 6.8 mm, 7 mm, 7.62 mm, 8 mm, 9 mm, 10 mm, 12.7 mm, 14.5 mm, 20 mm, 25 mm, 30 mm, 40 mm and others.

In the practice of the present invention, the first step is to identify a candidate polymeric material. Room temperature and low temperature notched Izod impact data collected using ASTM D256 is available from the manufactures and distributors for many commercially available materials. One method of selecting a material in accordance with practice of the present invention is to review published data and identify materials having room temperature notched Izod impact strengths greater than about 10 ft-lb/in. Next, the ratio of room temperature notched Izod impact strength to notched Izod impact strength at −40° C. or colder is calculated. If the ratio is 4 or less, then the material is identified in accordance with the invention as a candidate for use in ammunition cartridge casings of the present invention.

If a polymeric material's notched Izod impact strength at either room temperature or at −40° C. (or below) or both are unavailable from the material provider or from other reliable sources, then the material can first be qualitatively evaluated. In practicing the invention, one could examine impact strengths measured by impact test methods other than ASTM D256, e.g., unnotched Izod, Charpy, or ISO 180/4A, 180/1A, or 180/4U tests. Using these or other impact tests, if a material found to retain a significant portion of its impact strength when cooled from room temperature to −40° C., then the material is likely suited for forming ammunition casings of the present invention. If low-temperature impact data are unavailable, materials having high room temperature impact strengths (greater than 10 ft-lb/in notched Izod or equivalently high by another impact test) should be tested at low temperature. One would perform a notched Izod test according to ASTM D256 on such a material at room temperature (23° C.) and at −40° C. and calculate the ratio of impact strengths to determine whether the material meets the guidelines of the invention.

Another method of practicing the present invention involves modifying an existing polymeric material to meet the impact requirements provided by the invention. For example, a high impact polymer such as polycarbonate could be added to and blended with any number of other materials in various combinations and amounts to improve the low temperature impact strength and other properties. Unlimited compositions could be produced and tested for notched Izod impact strength at room temperature and at −40° C. to determine if the impact strength ratio is 4 or less. If a material is found to meet the impact strength requirements of the invention, then the material is considered suitable for use in ammunition cartridge casings provided in accordance with the present invention.

In practice of the present invention, for example, a series of polymer blends is prepared from a high impact thermoplastic such as PC with varying amounts of a high modulus polymer. Blends with iterative amounts of high modulus polymer varying from 0.1% by weight to 25% by weight are prepared using a known blending method such as heated extrusion. Samples of the blended materials are molded and impact tested at 23° C. and −40° C. according to ASTM D256. The ratio of impact strength at room temperature and low temperature is calculated for each blend composition. Of the samples having high room-temperature impact strength (greater than 10 ft-lb/in), the blend having the lowest calculated impact strength ratio contains the optimum amount of high modulus material. If the ratio is less than about 4, then the material is identified as a candidate for use in cartridge casings provided in accordance with practice of the present invention. The particular materials given in this example are representative and are non-limiting. Many types of additives known in the art could be compounded with many base resins and tested as described to determine whether the resulting material meets the impact property requirements of the invention. This method illustrates a general procedure for identifying casing materials according to the invention.

Testing polymer cased ammunition produced using the materials of the present invention is done by firing fully assembled live ammunition articles. First, materials which have been identified as useful for casing components are molded using standard methods and equipment (e.g., injection molding) to form polymeric cartridge caselets. The caselets are joined to metallic caps with pre-inserted primers. The resulting cartridges are loaded with a propellant charge, the type and amount of which can be readily determined by a skilled artisan. A projectile is inserted into the open end of the cartridge and secured. The article is thus prepared for test firing. Any size, caliber, or type of ammunition article can be assembled for live testing.

The cartridge casings provided in accordance with practice of this invention can, for example, be formed by injection molding, machining from a stock shape, thermoforming, compression molding, blow molding, and/or extrusion or the like.

Test firing polymer cased ammunition provided by this invention can be performed using any type of firearm corresponding to the size or caliber of the ammunition article produced. Ammunition articles can be test fired from a single shot firearm, a semi-automatic firearm, or an automatic firearm. Ammunition may be fired individually or from a clip, magazine, or belt containing multiple ammunition articles. Ammunition articles may be fired intermittently or in rapid succession; the rate of fire is limited only by the capabilities of the firearm.

Example 1

Four lightweight polymeric ammunition articles (.50-caliber/12.7 mm) were assembled from injection molded S-PC (Lexan® EXL 9330) caselets and caps machined from a steel alloy (P20). Each cap had a pre-installed primer (CCI #41). The caselets were designed with ridges around the rearward portion which created a snap interference fit with corresponding grooves on the cap interior, thus joining the caselet and cap securely. The cartridges were then filled with propellant (220 grains of WC 860). After loading the propellant, the projectiles (647 grains) were inserted into the cartridge and attached using an adhesive.

The assembled caselet geometry was modeled after standard brass .50 caliber ammunition including a wall thickness ranging from 0.0016 inch at its forward end to a maximum thickness of 0.0039 inch along its length.

After assembling four ammunition articles, the articles were test fired utilizing a single shot, .50-caliber rifle (Serbu BFG-50) instrumented for projectile velocity and chamber pressure measurements. Pressures and velocities were comparable to those obtained when brass ammunition was fired. All four (4) cartridge casings survived the firing intact.

Example 2

The procedure outlined in Example 1 was repeated using a different caselet material. Four lightweight polymeric ammunition articles (.50-caliber/12.7 mm) were assembled using caselets injection molded from B-PC (Makrolon® DP1-1848). The steel caps, propellant loads, and projectiles were identical to those used in Example 1. Measured pressures and velocities were comparable to those obtained using brass ammunition, and all four cartridge casings survived the firing intact.

Example 3

The procedure outlined in Example 1 was repeated using a different caselet material. Four lightweight polymeric ammunition articles (.50-caliber/12.7 mm) were assembled using caselets injection molded from PPSU (Radel® R-5800 NT). The steel caps, propellant loads, and projectiles were identical to those used in Example 1. Measured pressures and velocities were comparable to those obtained using brass ammunition, and all four cartridge casings survived the firing intact.

Example 4

The procedure outlined in Example 1 is repeated using another caselet material. Four lightweight polymeric ammunition articles (.50-caliber/12.7 mm) are assembled using caselets injection molded from a PC/PMMA blend (RTP 1899A X 83675). The steel caps, propellant loads, and projectiles are identical to those used in Example 1. Measured pressures and velocities are comparable to those obtained using brass ammunition, and all four cartridge casings survive the firing intact.

Example 5

The procedure outlined in Example 1 was repeated using a different cap material. Four lightweight polymeric ammunition articles (.50-caliber/12.7 mm) were assembled using caps machined from an aluminum alloy (A17068) and caselets injection molded from S-PC (Lexan® EXL 9330). The propellant loads and projectiles were identical to those in Example 1. Measured pressures and velocities were comparable to those obtained using brass ammunition, and all four cartridge casings survived the firing intact.

Example 6

The procedure outlined in Example 1 was repeated using a different cap material. Four lightweight polymeric ammunition articles (.50-caliber/12.7 mm) were assembled using caps machined from brass (70:30) and caselets injection molded from S-PC (Lexan® EXL 9330). The propellant loads and projectiles were identical to those in Example 1. Measured pressures and velocities were comparable to those obtained using brass ammunition, and all four cartridge casings survived the firing intact.

Example 7

A control experiment was performed according to the procedure outlined in Example 1 using a polymeric caselet material that does not meet the material specifications described in the present invention. Four lightweight polymeric ammunition articles (.50-caliber/12.7 mm) were assembled using caps machined from a steel alloy (P20) and caselets injection molded from Bisphenol-A polycarbonate (Lexan® 141R). The propellant loads and projectiles were identical to those in Example 1. Three of four cartridge casings survived the firing intact; one cartridge failed in that the caselet suffered an axial fracture and, also, the region which secured the caselet to the cap was completely severed, i.e., the cartridge was blown into two pieces.

Example 8

Ten lightweight polymeric ammunition articles (.223-caliber/5.56 mm) were assembled from injection molded S-PC (Lexan® EXL 9330) caselets and caps machined from brass (70:30). Each cap had a pre-installed primer (CCI #41). The caselets were designed with ridges around the lower portion which created a snap interference fit with corresponding grooves on the cap interior, thus joining the caselet and cap securely. The cartridges were then filled with propellant (23 grains of WC 844). After loading the propellant, the projectiles (62 grains) were inserted into the cartridge and attached using an adhesive.

After assembling ten ammunition articles, the articles were test fired in rapid succession utilizing a semi-automatic, .223-caliber rifle (Bushmaster AR-15) instrumented for projectile velocity and chamber pressure measurements. Pressures and velocities were comparable to those obtained using brass ammunition. All ten cartridge casings survived the firing intact. (For cartridge dimensions see, Military specification MIL-C-63989C, Drawing 9342868.)

Example 9

The procedure outlined in Example 8 was repeated using a different caselet material. Ten lightweight polymeric ammunition articles (.223-caliber/5.56 mm) were assembled using caselets injection molded from B-PC (Makrolon® DP1-1848). The brass caps, propellant loads, and projectiles were identical to those used in Example 8. Measured pressures and velocities were comparable to those obtained using brass ammunition, and all ten cartridge casings survived the firing intact.

Example 10

The procedure outlined in Example 8 was repeated using another caselet material. Ten lightweight polymeric ammunition articles (.223-caliber/5.56 mm) were assembled using caselets injection molded from PPSU (Radel® R-5800 NT). The brass caps, propellant loads, and projectiles were identical to those used in Example 8. Measured pressures and velocities were comparable to those obtained using brass ammunition, and all ten cartridge casings survived the firing intact.

Example 11

The procedure outlined in Example 8 is repeated using another caselet material. Ten lightweight polymeric ammunition articles (.223-caliber/5.56 mm) are assembled using caselets injection molded from a PC/PMMA blend (RTP 1899A X 83675). The brass caps, propellant loads, and projectiles are identical to those used in Example 8. Measured pressures and velocities are comparable to those obtained using brass ammunition, and all ten cartridge casings survive the firing intact.

Example 12

The procedure outlined in Example 8 is repeated using a different cap material. Ten lightweight polymeric ammunition articles (.223-caliber/5.56 mm) are assembled using caps machined from an aluminum alloy (A17068) and caselets injection molded from S-PC (Lexan® EXL 9330). The propellant loads and projectiles are identical to those used in Example 8. Measured pressures and velocities are comparable to those obtained using brass ammunition, and all ten cartridge casings survive the firing intact.

Example 13

The procedure outlined in Example 8 was repeated using a different cap material. Ten lightweight polymeric ammunition articles (.223-caliber/5.56 mm) were assembled using caps machined from a steel alloy (P20) and caselets injection molded from S-PC (Lexan® EXL 9330). The propellant loads and projectiles were identical to those used in Example 8. Measured pressures and velocities were comparable to those obtained using brass ammunition, and all ten cartridge casings survived the firing intact.

Example 14

A control experiment was performed according to the procedure outlined in Example 8 using a polymeric caselet material that does not meet the material specifications described in the present invention. Ten lightweight polymeric ammunition articles (.223-caliber/5.56 mm) were assembled using caps machined from brass (70:30) and caselets injection molded from an elastomer-modified, high-impact PA612 (Zytel® FE 8194 NC010). The propellant loads and projectiles were identical to those in Example 8. Only eight of the ten rounds fully survived the firing event. Examination of the spent casings revealed significant stretching or elongation of the neck region, which secured the projectile in one sample and a crack near the caselet/cap interface in a second sample.

Example 15

Two hundred polymeric ammunition articles (.223-caliber/5.56 mm) are assembled from injection molded rubber filled polyamide (Zytel® FE8194 NC010) caselets and caps machined from brass (70:30). Each cap has a pre-installed primer. The caselets are designed with ridges around the lower portion which create a snap interference fit with corresponding grooves on the cap interior, thus joining the caselet and cap securely. The cartridges are then filled with propellant (23 grains of WC 844). After loading the propellant, the projectiles (55 grains) are inserted into the cartridge and attached using an adhesive.

After assembling two hundred ammunition articles, the articles are loaded into seven thirty-round magazines. The ammunition is tested using a fully-automatic, .223-caliber rifle (M-4). The weapon is continuously fired by emptying and then quickly exchanging magazines. The weapon jams before completing the test. Inspection reveals that the cartridge casings overheat and fail in the hot chamber.

Example 16

Lightweight polymeric ammunition articles (.223-caliber/5.56 mm were assembled from injection molded rubber filled polyamide (Zytel FESI 94 NCOI 0) caselets and caps machined from brass (70:30). Each cap had a pre-installed primer. The caselets were designed with ridges around the lower portion which created a snap interference fit with corresponding grooves on the cap in tenor, thus joining the caselet and cap securely. The cartridges were then filled with propellant (23 grains of WC 844). After loading the propellant, the projectiles (55 grains) were inserted into the cartridge and attached using an adhesive.

A fully-automatic .223 caliber (5.56 mm) M-4 rifle was used to test the assembled ammunition. Brass ammunition was fired in fully automatic mode to heat the cartridge chamber. The chamber temperature was approximately measured by a thermocouple strapped to the exterior of the chamber. After firing many brass rounds the thermocouple indicated an external chamber temperature of 250° C., a 30-round magazine of the polymer cased ammunition of this example was quickly inserted into the firearm and a 2-3 round, burst was fired, leaving the subsequent round in the hot chamber. After a 1-minute heat soak, the round was fired and the firearm jammed severely. Inspection revealed that the cartridge case softened in the chamber and collapsed upon firing, lodging the case in the chamber. Thus, subsequent cased rounds produced from the Zytel material could not be fired.

The above descriptions of exemplary embodiments of ammunition articles of the present invention and processes for producing such articles are for illustrative purposes. Because of variations which will be apparent to those skilled in the art, the present invention is not intended to be limited to the particular embodiment described above. The scope of the invention is described in the following claims.

What is claimed is:

1. A blend comprising a polyphenylsulfone and a rigid-rod polyphenylene copolymer, wherein
   a room temperature notched Izod impact strength of the polyphenylsulfone is greater than about 10 ft-lb/in, as measured by ASTM D256-00 and
   a ratio of notched Izod impact strength at room temperature to notched Izod impact strength at about −40° C. of the polyphenylsulfone is less than about 4; and
   the rigid-rod polyphenylene copolymer is a copolymer of formula (1):

$$(-Ar-/-Y-)_n \quad (1)$$

wherein
   n is an integer of 4 or larger,
   a content of —Ar— in the rigid-rod copolymer is at least 0.1 mol %, and
   —Ar— consists of arylene repeat units of formula (2) and formula (3):

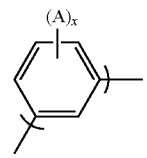

(2)

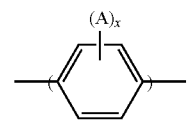

(3)

a number average of the arylene repeat units (2) and (3) of —Ar— is greater than 4,
   a number average of para-arylene repeat units in formula (3) is between 1 and about 8;
   a number average of meta-arylene repeat units in formula (2) is greater than 1;
   x of each repeating phenylene unit of formula (2) and formula (3) is independently an integer from 0 to 4, with the proviso that at least 1 of every 100 repeat units has a pendent side group A; and
   A of each phenylene unit is independently selected from the group consisting of —F, —CN, —CHO, —COR, —CR=NR', —OR, —SR, —SO₂R, —OCOR, —CO₂R, —NRR', —N=CRR', —NRCOR', —CONRR', and R, wherein R and R' are each independently selected from the group consisting of H, alkyl, substituted alkyl, aryl, substituted aryl, heteroaryl and substituted heteroaryl, and optionally R and R' if present together may form a bridging group;
   Y is nil or at least one divalent group selected from the group consisting of —Z—, —Z-Ph-, and -Ph-Z-Ph-, wherein Z is a divalent group selected from the group consisting of —O—, —S—, —NR—, —O(CO)—, —O(CO₂)—, —(CO)NH(CO)—, —NR(CO)—, phthalimide, pyromellitimide, —CO—, —SO—, —SO$_2$—, —P(O)R—, —CH$_2$—, —CF$_2$—, and —CRR'— and wherein Ph is ortho, meta or para-phenylene.

2. The blend of claim 1, wherein A is selected from the group consisting of alkyl, aryl, alkyl ketone, aryl ketone, alkoxy, aryloxy, alkylester, arylester, alkylamide and arylamide.

3. The blend of claim 1, wherein A is selected from the group consisting of acetyl, benzoyl, carbomethoxy, formyl, phenoxy, phenoxybenzoyl, and phenyl.

4. The blend of claim 1, which consists of the polyphenylsulfone and the rigid-rod polyphenylene copolymer.

5. The blend of claim 1, which further comprises an additive selected from the group consisting of plasticizers, lubricants, molding agents, fillers, thermooxidative stabilizers, flame-retardants, coloring agents, compatibilizers, impact modifiers, release agents, reinforcing fibers, and combinations thereof.

6. The blend of claim 1, wherein an amount of the rigid-rod polyphenylene copolymer is about 50% by weight or less.

7. The blend of claim 6, wherein the amount of the rigid-rod polyphenylene copolymer is from about 5% by weight to about 50% by weight.

8. The blend of claim 6, wherein the amount of the rigid-rod polyphenylene copolymer is from about 5% by weight to about 25% by weight.

9. The blend of claim 1, wherein the blend has a room temperature notched Izod impact strength greater than about 10 ft-lb/in (as measured by ASTM D256-00) and a ratio of notched Izod impact strength at room temperature to notched Izod impact strength at about −40° C. of less than about 4.

\* \* \* \* \*